(12) United States Patent
Ruhdorfer

(10) Patent No.: US 8,206,802 B2
(45) Date of Patent: Jun. 26, 2012

(54) TRIM PANEL

(75) Inventor: Herbert Ruhdorfer, Salzburg (AT)

(73) Assignee: Interglarion Limited, Nikosia (CY)

( * ) Notice: Subject to any disclaimer, the term of this patent is extended or adjusted under 35 U.S.C. 154(b) by 419 days.

(21) Appl. No.: 12/523,912

(22) PCT Filed: Feb. 15, 2008

(86) PCT No.: PCT/EP2008/001182
§ 371 (c)(1),
(2), (4) Date: Jul. 21, 2009

(87) PCT Pub. No.: WO2008/098783
PCT Pub. Date: Aug. 21, 2008

(65) Prior Publication Data
US 2010/0009115 A1    Jan. 14, 2010

(30) Foreign Application Priority Data
Feb. 16, 2007  (DE) .......................... 10 2007 007 832

(51) Int. Cl.
*B32B 3/06* (2006.01)
(52) U.S. Cl. ................ 428/60; 52/578; 428/58; 428/99; 428/116; 428/195.1
(58) Field of Classification Search .................... 428/60, 428/116, 58, 99, 195.1; 52/578
See application file for complete search history.

(56) References Cited

U.S. PATENT DOCUMENTS

| 4,603,531 | A  | 8/1986 | Nash     |      |
|-----------|----|--------|----------|------|
| 6,865,855 | B2 | 3/2005 | Knauseder |     |
| 2004/0096624 | A1* | 5/2004 | Albright | 428/116 |
| 2006/0010820 | A1 | 1/2006 | Schwitte et al. | |

FOREIGN PATENT DOCUMENTS

| DE | 23 36 700 A1   | 2/1975 |
| DE | 43 01 565 A1   | 7/1994 |
| DE | 201 01 021     | 7/2001 |
| EP | 1 024 234 A2   | 6/1997 |
| EP | 1 319 773 A2   | 6/1998 |

(Continued)

OTHER PUBLICATIONS

Japan Office action that issued with respect to patent family member Japanese Patent Application No. 2009-549798, mail date is Aug. 30, 2011.

(Continued)

*Primary Examiner* — Brent Ohern
(74) *Attorney, Agent, or Firm* — Greenblum & Bernstein, P.L.C.

(57) ABSTRACT

Trim panel including a decoration layer having a decoration side provided with a decoration, a contact layer having a contact side structured and arranged for contact with a substrate, and an intermediate layer having a cell structure and being at least one of: connected one of indirectly or directly to the decoration layer and connected one of indirectly or directly to the contact layer. A connecting layer is produced from a wood material and formed in one piece with at least one connecting element formed on at least two opposing sides of the connector layer in the form of complementary tongue and groove connectors. Intermediate layer is one of: arranged on a side of connecting layer facing towards decoration layer or on a side of connecting layer facing towards contact layer, and is exposed on edges of trim panel running orthogonally to panel plane.

21 Claims, 2 Drawing Sheets

FOREIGN PATENT DOCUMENTS

| | | |
|---|---|---|
| JP | 61-203941 | 12/1986 |
| JP | 04-194139 | 7/1992 |
| JP | 10-138404 | 5/1998 |
| JP | 10-325209 | 12/1998 |
| JP | 2001-505140 | 4/2001 |
| JP | 2002-339548 | 11/2002 |
| JP | 2004-076463 | 3/2004 |
| JP | 2006-9263 | 1/2006 |
| JP | 2008-529835 | 8/2008 |
| WO | WO 00 30845 | 6/2000 |
| WO | WO 02/052113 A2 | 7/2002 |

OTHER PUBLICATIONS

International Preliminary Report on Patentability for PCT/JP2008/001182, mailed Oct. 15, 2009.

* cited by examiner

TRIM PANEL

CROSS-REFERENCE TO RELATED APPLICATIONS

The present application is a U.S. National Stage of International Patent Application No. PCT/EP2008/001182 filed Feb. 15, 2008, and claims priority under 35 U.S.C. §§119 and 365 of German Patent Application No. 10 2007 007 832.5 filed Feb. 16, 2007. Moreover, the disclosure of International Patent Application No. PCT/EP2008/001182 is expressly incorporated by reference herein in its entirety.

BACKGROUND OF THE INVENTION

1. Field of the Invention

The invention relates to a trim panel, comprising a decoration side provided with a decoration, a contact side intended for contact with a substrate and a connecting layer produced from a wood material, with which at least one connecting element of a connecting arrangement embodied in the manner of a tongue and groove connection is embodied in one piece.

2. Discussion of Background Information

Trim panels of this type are known for example from EP 1 319 773 A2. Essentially the entire volume of the known trim panels is composed of the wood material, for example, MDF (medium density fiberboard) or HDF boards (high density fiberboard). A laminate is provided only on a visible or decoration side, which laminate is formed, for example, from a plurality of paper plies impregnated with synthetic resin, wherein the uppermost of these paper plies, i.e., that facing the eye of the observer, is printed with a decoration. Furthermore, a counteracting paper can be provided on the contact side.

With rising environmental awareness, the demand for renewable energy sources has also increased in the recent past. This has led among other things to an increase in the number of pellet-burning systems even in private homes. Since these pellets are likewise produced from wood, a decrease in the availability of wood on the market was the result. Not least the price increase associated therewith led to the desire to reduce the wood consumption per unit area of the trim panel with the given thickness of the generic trim panel.

SUMMARY OF THE EMBODIMENTS

According to the invention, a trim panel of the generic type meets this requirement in which at least one intermediate layer having a cell structure is arranged on the side of the connecting layer facing towards the decoration side, which intermediate layer is connected indirectly or directly to a decoration layer having the decoration side, and/or at least one intermediate layer having a cell structure is arranged on the side of the connecting layer facing towards the contact side, which intermediate layer is connected indirectly or directly to a contact layer having the contact side.

As can be easily realized the wood consumption according to the invention is reduced in that a part of the volume of the trim panel is accounted for by the at least one intermediate layer having a cell structure. The walls of the cell structure of the at least one intermediate layer thereby surround volumes filled with gas, preferably air. If it should be necessary with respect to the stability of the at least one intermediate layer, however, the volumes of the at least one intermediate layer can also be filled at least in part with a stabilizing medium, for example, a foamed medium.

In a further development of the invention it is proposed that the walls of the cell structure are formed at least in part of a non-metallic, lightweight structural material. The structural material can thereby be paper and/or cardboard and/or paperboard, for example, wherein these materials differ mainly through their weights per unit area and one also encounters conceptual overlapping of these designations among experts.

Furthermore, it is possible that the structural material is impregnated and/or reinforced with at least one thermoplastic material and/or at least one thermosetting plastic, for example, with polyolefin plastic.

With respect to the highest possible stability of the at least one intermediate layer it is furthermore advantageous if the walls of the cell structure run essentially orthogonally to the panel plane.

In a further development of the invention, it is furthermore proposed that at least a part of the cells of the cell structure in a section taken essentially parallel to the panel plane has a hexagonal cross section or a rectangular, for example, square, cross section or a triangular cross section.

At this point it should be noted that the use of cell structures of this type is known per se from door leaves, for example. However, with these applications the cell structure layer is surrounded on its edges running orthogonally to the door leaf plane or panel plane by a solid frame, which guarantees the stability of the panel with respect to shearing forces running parallel to the panel plane and thus prevents a lateral buckling of the walls of the cell structure. In contrast thereto, however, the at least one intermediate layer is exposed on the edges of the trim panel according to the invention running orthogonally to the panel plane. However, surprisingly this does not have any negative impact on the stability of the trim panel according to the invention. This exposure does not represent a disadvantage from an esthetic viewpoint, either, since the trim panels are laid with decoration sides adjoining one another.

The connecting layer of the trim panel according to the invention can be formed by, for example, an MDF board, an HDF board, a particle board, a chipboard, a plywood board or a combination board, which contains at least one of the materials of chips, MDF and HDF. A combination board of chips with plywood or a chemically and thermally posthardened HDF board can be cited as an example.

Depending on the intended field of application, the decoration layer can also be formed of different materials or assembled from different materials.

For example, the decoration layer can comprise a carrier layer and a decorative ply connected to the carrier layer. The decorative ply is thereby usually arranged on the surface of the carrier layer facing towards the decoration layer.

The carrier layer can be formed of an HDF board, for example. However, in principle the use of other materials to form the carrier layer is also conceivable. Furthermore, the decorative ply can comprise a laminate, which is formed, for example of a plurality of paper plies impregnated with synthetic resin.

In a further development of the invention it is proposed that the decoration side of the decoration layer is formed by a paper ply printed with a decoration. This decoration paper ply can thereby be a paper ply of the above-mentioned laminate. Furthermore, it is possible to arrange a so-called overlay paper on the printed side of this decoration paper ply, in order to increase the wear resistance of the decoration. Overlay papers of this type are usually likewise impregnated with synthetic resin and transparent in this state so that they do not impede the view of the decoration.

In a further development of the invention it can furthermore be provided that the decoration layer comprises a veneer at least on its decoration side. This veneer can thereby form only the decoration ply of the decoration layer, which is arranged on a carrier layer of the decoration layer. However, it is also possible that the veneer forms the entire decoration layer. Furthermore, the veneer can also be covered with an overlay paper to increase the wear resistance.

Different embodiment variants can also be considered with respect to the contact layer depending on the field of use. For example, the contact layer can comprise an HDF board or a thin laminate. In the case of the use of the trim panel according to the invention as a floor panel, the contact layer can furthermore comprise an impact-sound sheet. Furthermore, with respect to the dimensional stability of the trim panel, in particular to avoid a bulging or dishing of the panel it can be advantageous if the contact side of the contact layer is formed by a counteracting paper ply.

It should be noted at this point that the connection arrangement embodied in the manner of a tongue and groove connection can produce a connection of adjacent trim panels through an essentially planar relative displacement of the two adjacent panels essentially in the panel plane and/or by pivoting into one another the connecting elements of the two adjacent panels about a plane running essentially parallel to the panel plane, as is known per se from EP 1 024 234 A1. Furthermore, it is possible that the trim panels are embodied exclusively with connecting grooves and that double-tongue elements have to be provided in addition for connecting adjacent panels, as is known, for example, from EP 1 319 773 A2.

The trim panels can be used for wall, ceiling or floor trim, wherein their layer thickness measured orthogonally to the panel plane can be between approximately 3 mm and approximately 40 mm.

BRIEF DESCRIPTION OF THE DRAWINGS

The invention is explained in more detail below with exemplary embodiments based on the attached drawings. They show.

DETAILED DESCRIPTION OF THE EMBODIMENTS

Figure 1:
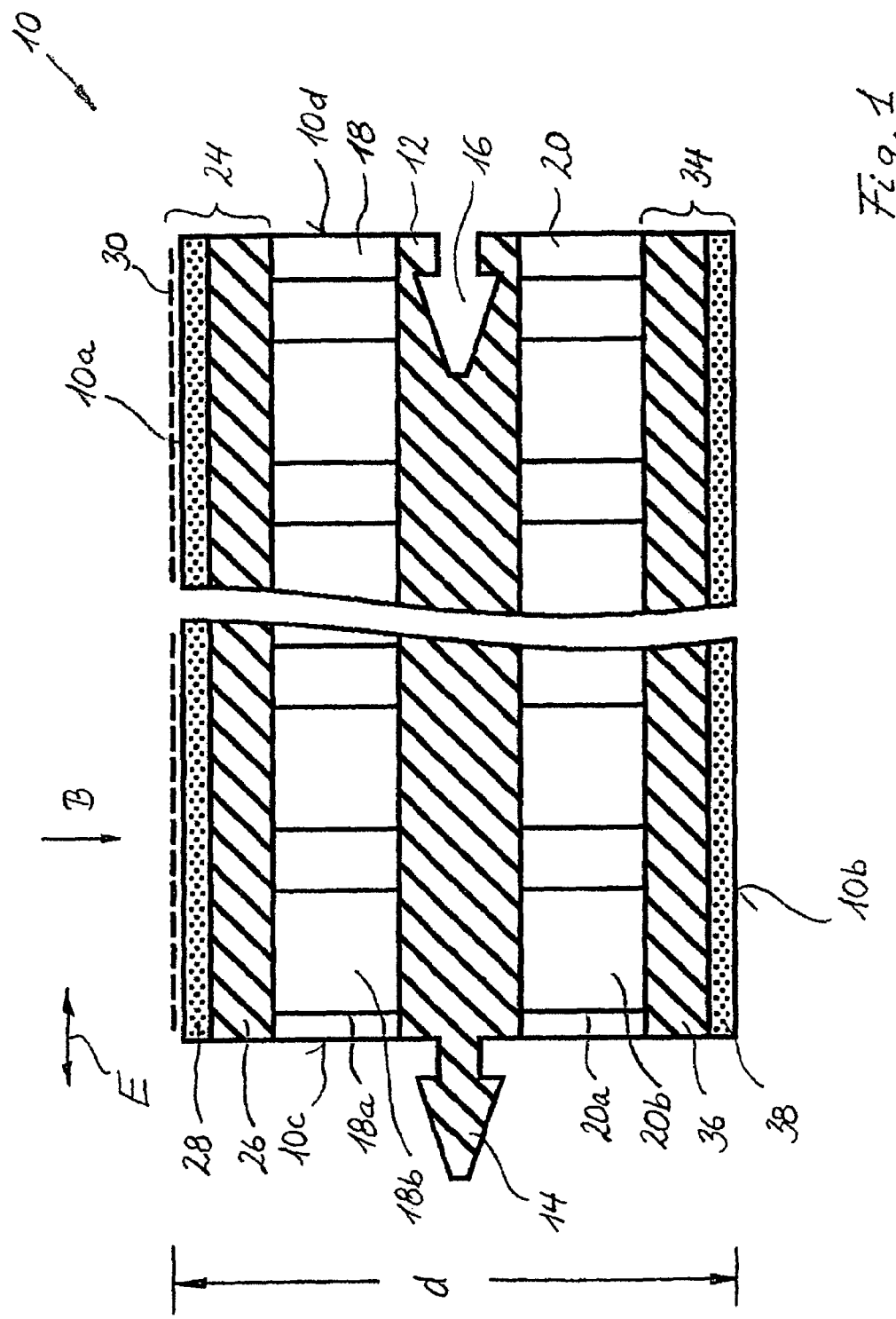
FIG. 1 A cross-sectional view of a concrete exemplary embodiment of a trim panel according to the invention.

In FIG. 1 a trim panel according to the invention is generally labeled by 10. It comprises a decoration side 10a and a contact side 10b intended for contact on a substrate (not shown). The decoration side 10a and the contact side 10b run essentially parallel to the panel plane E. Furthermore, the panel 10 is limited by side edges running essentially orthogonally to the panel plane E, of which side edges only the edges 10c and 10d are shown in FIG. 1.

Panel 10 comprises a connecting layer 12, with which a connecting tongue 14 is embodied in one piece on the side surface 10c of the panel 10 and with which a connecting groove 16 is embodied in one piece on the side surface 10d. It should be noted that corresponding connecting elements can also be provided on the side edges of the panel 10 not shown in FIG. 1.

In the exemplary embodiment according to FIG. 1 an intermediate layer 18 or 20, which has a cell structure, is arranged respectively on the side of the connecting layer 12 facing towards the decoration side 10a as well as on the side of the connecting layer 12 facing towards the contact side 10b. The walls 18a or 20a of this cell structure preferably run essentially orthogonally to the panel plane E and have a honeycomb-shaped arrangement, for example, in the viewing direction B. Furthermore, the walls 18a and 20a can be formed of cardboard, for example, which is impregnated with a thermoplastic or thermosetting plastic in order to ensure the necessary stability of the intermediate layer 18 or 20. The gaps 18b or 20b are preferably filled with air.

On the side of the intermediate layer 18 facing towards the decoration side 10a, a decoration layer 24 adjoins thereto, which in the exemplary embodiment shown comprises a carrier layer 26 and a decoration ply 28. The carrier layer 26 can be an HDF board, for example, whereas the decoration ply 28 can be of a laminate of paper plies impregnated with synthetic resin, the uppermost of which, i.e., that closest to the decoration side 10a, is printed with a desired decoration. As is known per se, the decoration ply 28 moreover can be covered with an overlay paper ply 30. However, alternatively it is also possible that the decoration ply 28 or even the entire decoration layer 24 is formed by a veneer, which can optionally likewise be covered by an overlay paper ply 30.

A contact layer 34 is also provided in a corresponding manner on the side of the intermediate layer 20 facing towards the contact side 10b, which contact layer comprises a carrier layer 36 and a counteracting paper 38 in the depicted exemplary embodiment. However, it is also possible to embody the contact layer 34 as a thin laminate or to provide an impact-sound sheet additionally or alternatively to the carrier layer and/or the counteracting paper layer 38.

The connecting layer 12 and the two intermediate layers 18 and 20 can respectively have a thickness of approximately 2 mm, for example, while the decoration layer 24 and the contact layer 34 have a thickness of approximately 1 mm, so that in all a panel thickness d of approximately 8 mm measured orthogonally to the panel plane E results.

Figure 2:
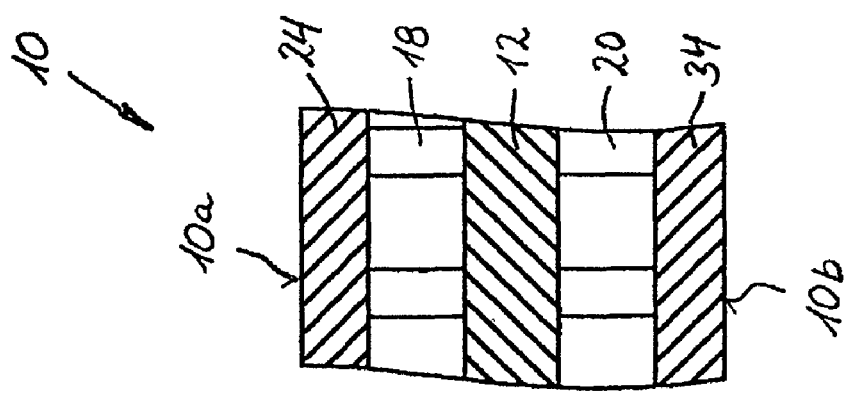

The fundamental structure of the exemplary embodiment according to FIG. 1 is shown once again in FIG. 2.

Figure 4:
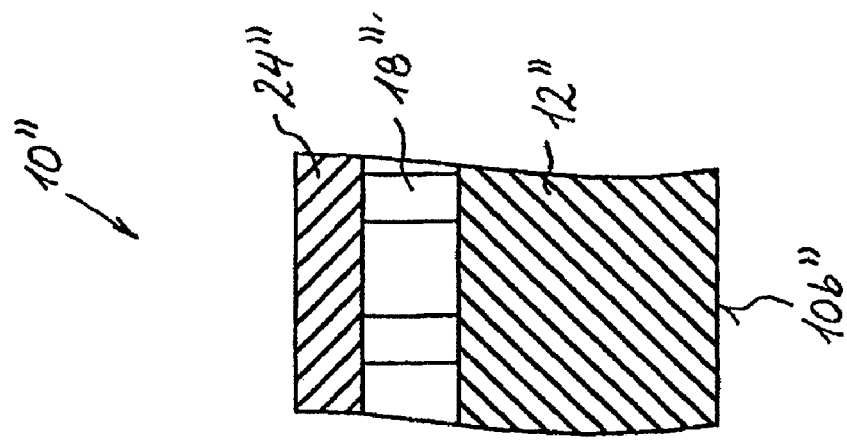
FIGS. 2-4 Cross-sectional representations analogous to FIG. 1 to explain the basic structure of different variants of the trim panels according to the invention.
Figure 3:
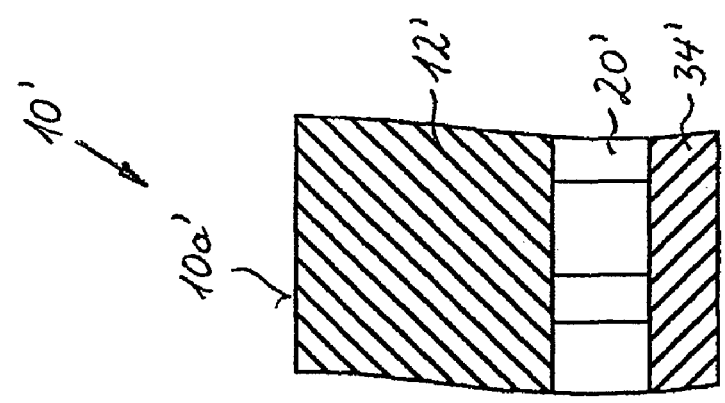

FIGS. 3 and 4 are used merely to clarify that is also possible in principle to provide only a single intermediate layer.

Based on this embodiment, in the panel 10' according to FIG. 3 the connecting layer 12' extends up to the decoration side 10a', while the panel 10' with respect to the intermediate layer 20' and the contact layer 34' corresponds to the panel 10 according to FIG. 2. In a corresponding manner in the panel 10" according to FIG. 4 the connecting layer 12" extends up to the contact side 10b" of the panel 10", whereas the panel 10" with respect to the intermediate layer 18" and the decoration layer 24" corresponds to the panel 10 according to FIG. 2. The connecting layer 12' of the embodiment according to FIG. 3 thus also forms in one piece the carrier layer 26 of the decoration layer 24, and the connecting layer 12" of the embodiment according to FIG. 4 also forms in one piece the carrier layer 36 of the contact layer 34. With respect to the further embodiment in the area of the decoration side 10a' or the contact side 10b", reference can be made to the statements on the embodiment according to FIG. 1.

The invention claimed is:
1. A trim panel, comprising:
a decoration layer having a decoration side provided with a decoration;
a contact layer having a contact side structured and arranged for contact with a substrate; and
an intermediate layer having a cell structure and being at least one of: connected one of indirectly or directly to the decoration layer, and connected one of indirectly or directly to the contact layer;

a connecting layer produced from a wood material and being formed in one piece with at least one connecting element formed on at least two opposing sides of the connector layer in the form of complementary tongue and groove connectors, wherein the intermediate layer is one of: arranged on a side of the connecting layer facing towards the decoration layer or on a side of the connecting layer facing towards the contact layer, and wherein the intermediate layer is exposed on the edges of the trim panel running orthogonally to the panel plane.

2. The trim panel according to claim 1, wherein the walls of the cell structure of the at least one intermediate layer surround volumes filled with gas.

3. The trim panel according to claim 1, wherein the walls of the cell structure are formed at least in part of a non-metallic, lightweight structural material.

4. The trim panel according to claim 3, wherein the structural material is at least one of paper, cardboard, and paperboard.

5. The trim panel according to claim 3, wherein the structural material is at least one of impregnated and reinforced with at least one of: at least one thermoplastic material and at least one thermosetting plastic.

6. The trim panel according to claim 1, wherein the walls of the cell structure run essentially orthogonally to a panel plane parallel to the decoration side.

7. The trim panel according to claim 1, wherein at least a part of the cells of the cell structure has at least one of a hexagonal cross section, a rectangular cross section, a square cross section, and a triangular cross section.

8. The trim panel according to claim 1, wherein the connecting layer is formed by one of: a medium density fiber (MDF) board, a high density fiber (HDF) board, a particle board, a chipboard, a plywood board or a combination board containing at least one of the materials of chips, MDF and HDF.

9. The trim panel according to claim 1, wherein the decoration layer comprises a carrier layer and a decorative ply connected to the carrier layer.

10. The trim panel according to claim 9, wherein the carrier layer comprises a high density fiber (HDF) board.

11. The trim panel according to claim 9, wherein the decorative ply comprises a laminate.

12. The trim panel according to claim 1, wherein the decoration side of the decoration layer is formed by a paper ply printed with a decoration.

13. The trim panel according to claim 1, wherein the decoration layer comprises a veneer at least on its the decoration side.

14. The trim panel according to claim 1, wherein the contact layer comprises a high density fiber (HDF) board.

15. The trim panel according to claim 1, wherein the contact layer comprises a thin laminate.

16. The trim panel according to claim 1, wherein the contact layer comprises an impact-sound sheet.

17. The trim panel according to claim 1, wherein the contact side of the contact layer is formed by a counteracting paper ply.

18. The trim panel according to claim 1, wherein the trim panel has a thickness of between approximately 3 mm and approximately 40 mm.

19. The trim panel according to claim 1, wherein the cell structure of the at least one intermediate layer surround volumes filled with air.

20. The trim panel according to claim 3, wherein the at least one thermosetting plastic comprises polyolefin plastic.

21. A trim panel, comprising:
    a decoration layer having a decoration side provided with a decoration;
    a contact layer having a contact side structured and arranged for contact with a substrate;
    a first intermediate layer having a cell structure and being at least one of: connected one of indirectly or directly to the decoration layer;
    a second intermediate layer having a cell structured and being at least one of:
    connected one of directly and indirectly to the contact layer;
    a connecting layer comprising a wood material and being formed in one piece with at least one connecting element formed on at least two opposing sides of the connector layer in the form of complementary tongue and groove connectors,
    wherein the first and second intermediate layers are arranged to sandwich the connecting layer, and
    wherein the first and second intermediate layers are exposed on the edges of the trim panel running orthogonally to the panel plane.

* * * * *